United States Patent [19]
Kadambi et al.

[11] Patent Number: 5,368,095
[45] Date of Patent: Nov. 29, 1994

[54] GAS TURBINE RECUPERATOR SUPPORT

[75] Inventors: Vedanth Kadambi, Monroe; James J. Morgia, Trumbull, both of Conn.; Jonathan Vendituoli, San Diego, Calif.

[73] Assignee: Avco Corporation, Providence, R.I.

[21] Appl. No.: 29,822

[22] Filed: Mar. 11, 1993

[51] Int. Cl.⁵ .............................................. F28F 9/22
[52] U.S. Cl. ................................ 165/83; 60/39.511
[58] Field of Search ........................... 165/81, 82, 83; 60/39.511

[56] References Cited

U.S. PATENT DOCUMENTS

| | | |
|---|---|---|
| 1,863,586 | 6/1932 | Wilke . |
| 2,015,819 | 10/1935 | Seligman et al. . |
| 2,562,135 | 10/1950 | Homes et al. . |
| 2,616,671 | 11/1952 | Wakeman . |
| 2,686,154 | 8/1954 | MacNeill . |
| 2,846,198 | 8/1958 | Sturges . |
| 2,868,514 | 1/1959 | Hodson et al. . |
| 3,252,510 | 5/1966 | Blankenhorn . |
| 3,889,744 | 6/1975 | Hill et al. ............................ 165/83 |
| 4,116,271 | 9/1978 | De Lepeleire . |
| 4,216,825 | 8/1980 | Sumitomo . |
| 4,291,752 | 9/1981 | Bridgnell . |
| 4,815,534 | 3/1989 | Fuerschbach . |
| 4,993,223 | 2/1991 | Kretzugir ...................... 60/39.511 |
| 5,004,004 | 4/1991 | Horgan . |

Primary Examiner—John C. Fox
Attorney, Agent, or Firm—Perman & Green

[57] ABSTRACT

A system for preheating air before it enters the combustion chamber of a gas turbine engine includes a recuperator which extends between, and is supported by, forward and rear headers. Cold air to be pre-heated by the recuperator flows through an entry passage in the forward header, then into and through a first conduit of the recuperator which extends the length of the recuperator. The air then flows through a plurality of cross conduits located at different locations along the length of the recuperator where it becomes heated by the flow of turbine exhaust gas. Flow of the now-heated air continues into a second conduit in which it is guided toward the combustion chamber. Transition members are provided between the forward and rear headers, respectively, and the assembly for thermally isolating the assembly from the remainder of the gas turbine engine and for accommodating relative movement between the assembly and the forward and rear headers resulting from temperature differentials occurring during operation of the gas turbine engine.

18 Claims, 4 Drawing Sheets

"A" PLATE
"B" PLATE

PRIOR ART

GAS TURBINE RECUPERATOR SUPPORT

BACKGROUND OF THE INVENTION

1. Field of the Invention

The present invention relates generally to recuperators for gas turbine engines and, more particularly, to a technique for reducing transient thermally induced stresses which result in recuperator failures referred to as "blowouts", thereby improving the operating life of the recuperator.

2. Discussion of the Prior Art

Brayton cycle engines generally utilize compressors for compressing air for the support of combustion, a combustion chamber which has inlets for both the compressed air and fuel, and means for extracting energy from the hot exhaust gases to produce mechanical work. To extract the energy, the hot exhaust gases produced in the combustion chamber are fed to a turbine that rotates a drive shaft. In a recuperated turbine engine, exhaust gases from the turbine are passed through a recuperative heat exchanger that heats the relatively cold compressed air from the compressor to maximize efficiency of the engine. The purpose of the recuperator, or regenerator as it is sometimes called when it is of a rotating construction, is to return some of the heat energy that would normally be lost with the exhaust, to the front of the combustion chamber. By doing this, less fuel is required to reach the turbine limiting temperatures and this will result in high thermal efficiency, low specific fuel consumption, and low exhaust gas temperature. Recuperators are commonly used on ground-power engines, but to a lesser extent on aircraft engines since this method of power recovery often results in excessive weight and/or air-sealing difficulties.

Typical of current recuperator designs is the construction disclosed in U.S. Pat. No. 5,004,044 to Horgan et al. In that instance, an annular heat exchange apparatus is provided for radially conducting a first fluid from a center aperture to an outer perimeter and is adapted for conducting a second fluid through the apparatus. The apparatus comprises a plurality of heat exchange modules and a plurality of second fluid conduit members. The heat exchange modules each have a rectilinear heat exchange means with a first fluid inlet side at the center aperture. The first fluid inlet sides substantially define the center aperture. The plurality of second fluid conduit members are located between adjacent modules for conducting the second fluid into the modules. In terms of construction, the heat exchanger comprises a plurality of parallel corrugated plates fixedly mounted together in a housing. The corrugations cause turbulence in the flow to improve heat exchange and they simultaneously provide rigidity to the structure.

Also known to the prior art are a variety of constructions for accommodating contractions and expansions of the components thereof. These include, for example, U.S. Pat. Nos. 2,526,135 to Holmes et al. and 2,015,819 to Seligman et al. However in neither of these instances was there any construction for accommodating heat-caused expansion and contraction of components adequate to solve the problems solved by the present invention.

SUMMARY OF THE INVENTION

The AGT1500 gas turbine engine has been designed for land vehicles, most notably, the M1A1 main battle tank used by the U.S. Army. This particular engine employs a recuperator for heating the air entering the combustion chamber. The recuperator extends between, and is mounted to, forward and rear headers which are integral parts of the engine structure. Presently, the AGT1500 production recuperator comprises a front header followed by a 30 mil plate, a 15 mil plate, three sets of "accordion" plates welded together at their outer and inner diameters and successive sets of A-B plate pairs, to form the core. As the core is subjected to an axial compressive force referred to as "preload" of approximately 15,000 lbf, the accordion plates are crushed into plane plates, resulting in stresses estimated at several times their yield limit near the outer diameter. When these plates are subjected to the operating engine transients, temperature differences exceeding 150°-200° F. are induced between adjacent plate pairs closest to the header. The resulting thermal stresses on areas close to the oval-shaped openings through which heated air flows from the recuperator to the combustor. These are the same areas as those that had yielded during the preloading of the matrix. Repeated cycling between full engine power and idle conditions causes low cycle fatigue cracks to appear in these areas. Eventually, the cracks increase in size and meet over triangularly shaped openings through which air to be heated is directed to the recuperator from the combustion chamber. Ultimately, the damage becomes severe enough to cause a "blow-out" resulting in air leakage and such a large loss in power that the engine may not even start again after its operation is terminated by the operator.

One thrust of the present invention, then, is to provide a flexible and non-crushable interface between the header and the plates of the core, so that most of the temperature differences are confined to the flexible region which is capable of withstanding the induced thermal stresses. Hence, to reduce the possibility of failure, it is necessary to ensure that (i) the bellows plates do not crush due to the application of preload or pressure, and (ii) the temperature differences that initiate the cracks are reduced to a sufficiently low level so that the induced thermal stresses are well below yield throughout the operating regime of the engine.

Similarly, the rear end of the recuperator presently experiences large thermally induced stresses at the inner diameter close to the rear header. These stresses are compressive during start and acceleration transients while they become tensile during deceleration and engine shut down periods. Repeated cycling under these conditions leads to failure, resulting in the axial forward movement of the oval-shaped openings at the inner diameter of the core, and the eventual development of large radial cracks in these areas.

Presently, the AGT1500 production recuperator comprises a core with a series of A-B plate-pairs ending in a blind A-plate at the rear end. Following the blind A-plate there are graphite-coated slider plates sandwiched between the core and the rear header. There is no weld or other type of connection between the blind A-plate and the graphite plates to permit the two to slide freely against each other if thermal mismatch results in differential growth. During engine transients, the temperature difference between adjacent plates in the neighborhood of the header can become as large as 150° F. at the inner diameter of the core, resulting in a differential increase in the size of the A-plate relative to its neighbors. However, the axial load on the plate (due to air pressure and preload) and the resulting frictional force at the interface between the members in contact is so large that the A-plate is unable to move and cannot relieve the thermal stresses. Moreover, due to inner-to-outer diameter temperature differences, the plates at the inner diameter that are forced flat against the rear header experience very large compressive stresses, exceeding yield by factors of three or four. If the temperature of the plates is reduced (as during a sudden deceleration), the inner diameter of the core plates now goes into tension in the areas which had yielded in compression before. A cyclic operation between compression and tension causes low cycle fatigue and eventual tearing of the blind A-plate (and some of its neighboring plates) during the part of the cycle at which tensile stresses occur. The leakage of air at the blind A-plate may indeed be large enough to require a replacement of the core.

Based upon a finite element calculation and the evaluation of stresses expected at the blind A-plate, a modified design is being recommended. As compared with the production recuperator, the design of the invention utilizes a mica insulator plate, 0.125" thick at the rear header, followed by two graphite-coated plane plates and six "accordion" plate pairs of the production design. In order to prevent crushing due to preload and to reduce the transient temperature differences (inner diameter to outer diameter on the blind A-plate, as well as the axially, between adjacent plate pairs), a set of spring plates and mica insulation plates 0.06" thick, are used as sandwich material within each pair of accordion plates. Finite element calculations show that the sandwiched insulations near the inner diameter ensure that the plate pair-to-plate pair axial temperature differences are reduced below 55° F., so that the thermal stresses do not exceed the yield limit (45,000 psi for INCO625, for example). In this manner, the design limits the inner diameter to outer diameter temperature differences to a level below 275° F. everywhere, so that the hoop stress does not exceed 43,000 psi.

Simulation tests conducted on a core fitted with this construction of insulation plate assembly have shown that there is no substantial crack or leakage at the inner diameter, after 400 hours, as the result of the thermal cycling process. This contrasts with standard AGT1500 production cores wherein the blind A-plate has been known to tear in 100 hours or less, with severe damage occurring in the neighborhood of 350 hours.

In short, the invention is an improvement on a system for preheating air before it enters the combustion chamber of a gas turbine engine. The system includes a recuperator which extends between, and is supported by, forward and rear headers. Cold air to be pre-heated by the recuperator flows through an entry passage in the forward header, then into and through a first conduit of the recuperator which extends the length of the recuperator. The air then flows through a plurality of cross conduits located at different locations along the length of the recuperator where it becomes heated. Flow of the now heated air continues into a second conduit in which it is guided toward the combustion chamber. Specifically according to the invention, transition members are provided between the forward and rear headers, respectively, and the assembly. These transition members serve to thermally isolate the assembly from the remainder of the gas turbine engine and to accommodate relative movement between the assembly and the forward and rear headers resulting from temperature differentials occurring during operation of the gas turbine engine.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

DETAILED DESCRIPTION OF THE PREFERRED EMBODIMENT

Some gas turbine engines incorporate a heat exchanger called a regenerator or recuperator. The latter term will be used throughout this specification. The purpose of the recuperator is to return to the front of the combustion chamber some of the heat energy that would normally be lost with the exhaust gases. By doing this, less fuel is required to reach the turbine operating temperatures, resulting in higher thermal efficiency, lower specific fuel consumption, and lower exhaust gas temperatures. Although regeneration has been used on a number of ground based engines, it is not customary to use this method of power recovery in aircraft engines because of excessive weight and air sealing difficulties. The present invention was originally devised for the AGT 1500 gas turbine engine manufactured by Textron Lycoming as the power plant for the M1A1 main battle tank used by the U.S. Army.

Figure 1:
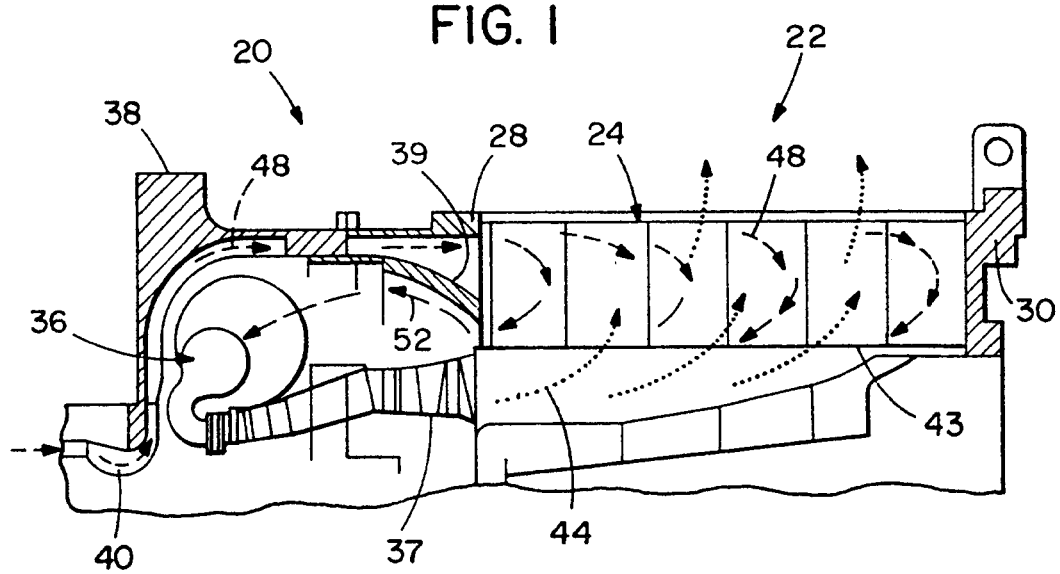
FIG. 1 is a side elevation diagrammatic view illustrating part of a gas turbine engine of the type embodying the present invention.

Turn now to the drawings and, initially, to FIG. 1 which is a diagrammatic cross section view of a portion of a gas turbine engine 20 such as the AGT 1500 and utilizing a recuperator 22. Throughout this disclosure, reference to the AGT 1500 engine is for the purpose of description only and is not to be considered as limiting the invention.

Figure 2:
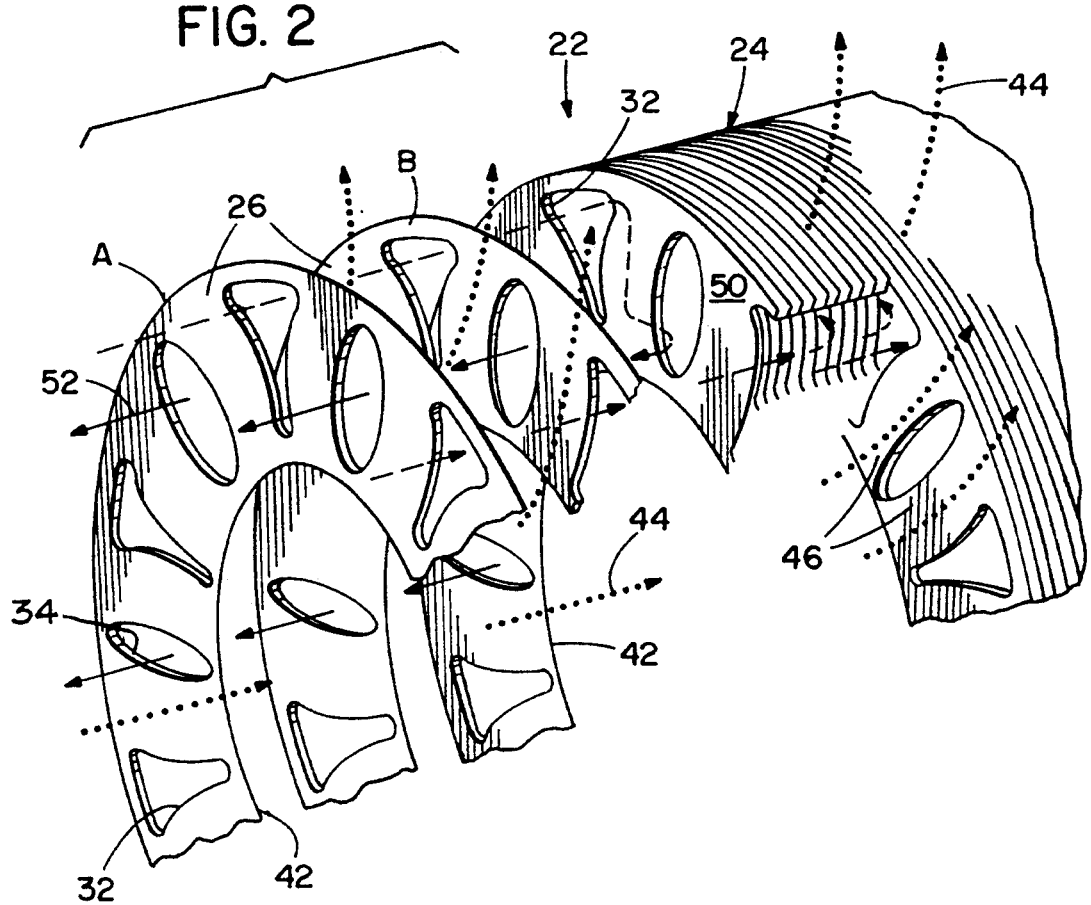
FIG. 2 is a detail perspective view, partly exploded, illustrating a part of a conventional recuperator for the gas turbine engine depicted in FIG. 1.
Figure 3:
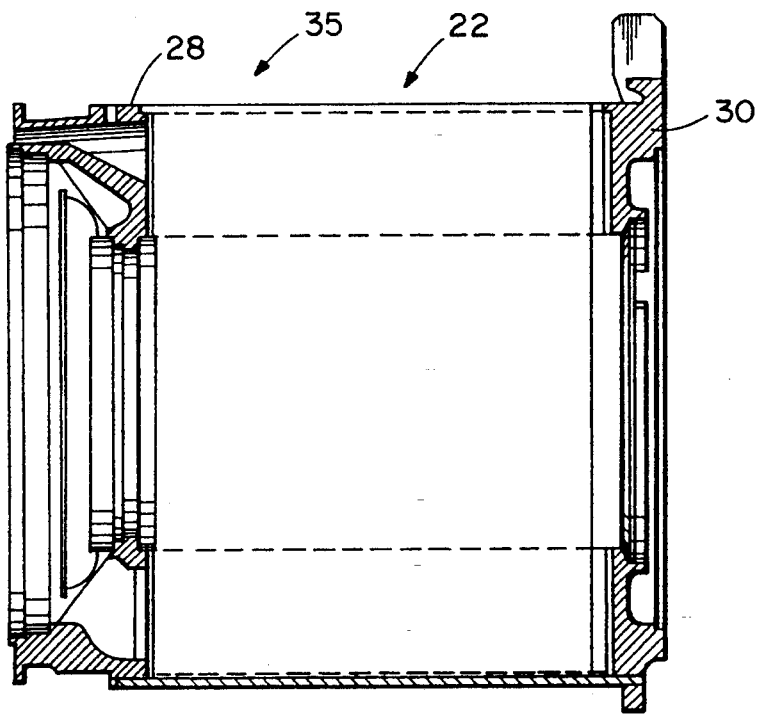
FIG. 3 is a side elevation diagrammatic view in section, illustrating the recuperator of FIG. 2 as it is supported between forward and rear headers of the type illustrated in FIG. 1.

Viewing especially FIGS. 1 and 2, the recuperator 22 comprises an assembly 24 including 275 pairs of annular plates or disks 26 in side-by-side spaced relationship supported between a forward header 28 and a rear header 30. The annular disks 26 in adjoining A-B plate pairs (FIG. 2) have a plurality of circumferentially spaced inlet openings 32, the inlet openings of each successive annular disk being aligned to define an inlet manifold 33 (FIG. 3). The inlet openings 32 are depicted as being generally triangularly shaped although they may be of any suitable shape. In similar fashion, the annular disks 26 are also formed with a plurality of circumferentially spaced outlet openings 34 generally intermediate the inlet openings 32. The outlet openings are depicted as being elliptical in shape although, as with the inlet openings 32, they may be of any suitable shape. Also, as with the inlet openings 32, the outlet openings 34 in successive annular disks 26 are aligned and generally in communication with one another to define an outlet manifold 35 (FIG. 3).

As seen in FIG. 1, the recuperator 22 is positioned aft (to the right) of a power turbine 37. A casing 38 for the engine supports a plurality of conduits 40 for delivering pressurized air from the compressor (not shown), around the combustion chamber 36 and through the openings 32 in the forward header 28 to the assembly 24.

Each of the annular disks 26 is formed with a central substantially circular opening 42 and the central openings 42 of each of the successive disks 26 define an exhaust passage 43 (FIG. 1) for receiving and transmitting the exhaust gases from the power turbine 37 to the recuperator. The annular disks 26 are so formed and joined together, in known manner, that the exhaust gases, indicated by arrows 44 travel along the passageway defined by the central openings 42 of the successive annular disks 26, then travel radially outwardly through radial passages 46 (FIG. 2) formed between adjoining disks 26. In a similar manner, pressurized intake, or cold, air represented by arrows 48 is caused to flow from the conduits 40, or through an inlet passage 39 within the forward header 28, through the passage defined by the inlet openings 32, that is, the inlet manifold 33, then through radially inward passages 50 formed between each of the annular disks 26 connecting the inlet openings 32 with the outlet openings 34, then flowing through the passage defined by the outlet openings 34, that is, the outlet manifold 35, and to the combustion chamber 36 as represented by arrows 52.

By reason of the operation just described, it will be appreciated that the exhaust gases represented by the arrows 44 serve to heat all the disks 26 of the assembly 24. The disks heat the air that flows over them on the side opposite to that of the hot gas. The heat from the exhaust gases is thereby transferred to the cold air flowing through the inlet manifold 33 and becomes even further heated as it passes through the outlet manifold 35. With the exhaust gases having temperatures in the range of approximately 900° F. to 1300° F., pre-heated air in the temperature range of approximately 600° F. to 1040° F. is thereby provided to the combustion chamber 36.

Both the massive forward header 28 and the rear header 30 have relatively high thermal capacitances as compared with the annular disks 26 of the assembly 24. Thus, when the system is subjected to operating engine transients, temperature differences exceeding 150° to 200° F. are induced between the annular disks 26 and the headers 28, 30. This causes extreme thermal stresses between the core or assembly 24 and the headers and repeated cycling between full engine power and idle causes fatigue cracks to appear. With time, these cracks increase in size and, eventually, can lead to catastrophic results.

Figure 4:
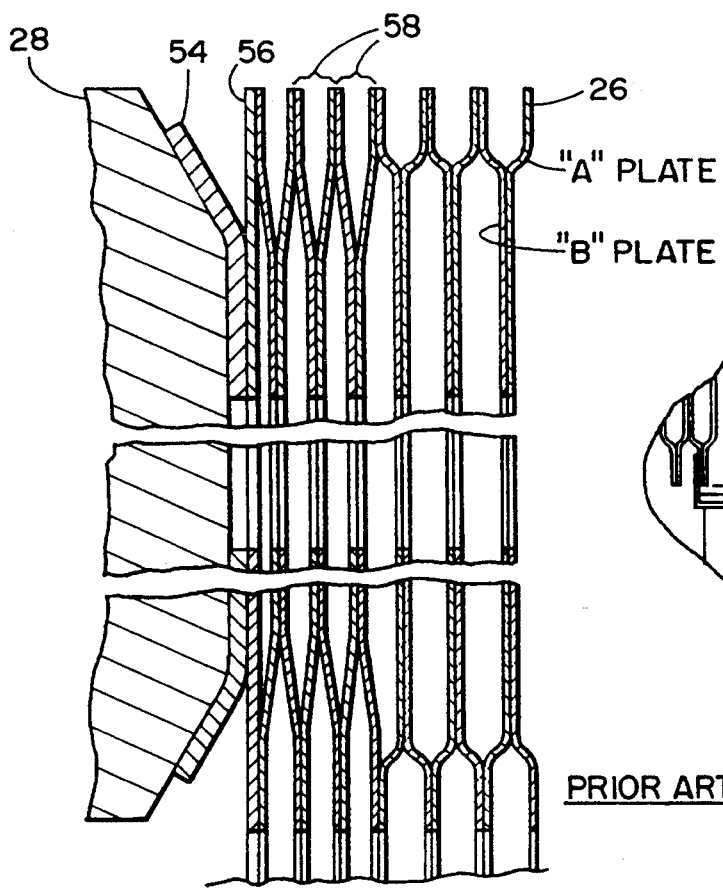
FIG. 4 is a detail cross-section view illustrating a conventional interface between the recuperator and the forward header.
Figure 5:
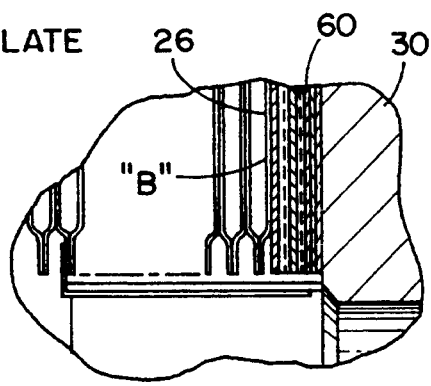
FIG. 5 is a detail cross-section view illustrating a conventional interface between the recuperator and the rear header.

For an explanation of the current construction of the interface between the assembly 24 and the headers 28, 30, turn now to FIGS. 3, 4, and 5. While it is recognized that dimensions are generally of no consequence from a patentability standpoint, thicknesses of various components will be mentioned here in order to provide the reader with a better general understanding of the construction utilized. Thus, at the present time, viewing FIG. 4, a 30 mil dish shaped plate 54 is suitably welded to the forward header 28, followed by a 15 mil flat plate 56 and 3 sets of "accordion" plates 58 which are welded together at their outer and inner diameters. The last, or rearmost, of the accordion plates 58 is suitably welded to the first of the annular disks 26, an A-plate of an A-B plate pair of the assembly 24 (see FIGS. 2 and 4, for example). When fully installed, the core of the assembly 24 is subjected to a compression preload between the headers 28, 30 of 15,000 lbf such that the accordion plates 58 are crushed into plane plates.

The current construction adjacent the rear header 30 is generally illustrated in FIG. 5. Between the rearwardmost annular disk 26, a B-plate, and the rear header 30 are a plurality of graphite-coated slider plates 60. There is no weld or other type of connection between the annular disks 26 and the slider plates 60. In this manner, the two types of plates are able to slide freely against one another in the event of thermal mismatch resulting in differential growth. It was earlier explained that during engine transients, the temperature differences between adjacent plates in the neighborhood of the rear header 30 can become as great as 150° F. adjacent the central opening 42. This can result in a differential radial increase in the size of each annular disk 26 relative to its neighbors. However, the axial load on the disks 26 as the result of air pressure and preloading and the resulting frictional forces at the interface between the members in contact is so large that each disk is unable to move and cannot relieve the induced thermal stresses. Moreover, due to inner-to-outer diameter temperature differences, the disks at the inner diameter that are forced flat against the rear header 30 experience very large compressive stresses which may exceed the yield stress of the metal by a factor of between approximately 3:1 and 4:1. If the temperature of the disks 26 is reduced, as may occur during a sudden deceleration, the inner diameter of each disk goes into tension in the areas which had previously experienced compression. A cyclic operation between compression and tension causes low cycle fatigue and eventually tearing of the disks nearest the rear header 30. Initially, this can cause leakage of air and can become sufficiently serious as to eventually require replacement of the assembly 24.

Transition constructions of the invention which correct all of these deficiencies will be described now. A first support assembly 62 comprises four nested 30 mil diaphragm plates 64, 66, 68, and 70 which are structurally strong and provide effective insulation between the forward header 28 and a second support assembly 72 which will be described below. The foremost diaphragm plate 64 is suitably welded to the forward header 28 and each succeeding diaphragm plate is welded to its adjacent diaphragm plates. Sixteen mil thick insulation plates 74 are sandwiched between the diaphragm plates 64, 66, 68, 70. The insulation plates 74 may comprise mica, for example, and serve to prevent the diaphragm plates from collapsing due to preload and also act as effective thermal insulators. Most of the temperature difference and the induced thermal stresses between the forward header 28 and the assembly 24 are confined to the first support assembly 62 during the whole operating regime of the engine. It is estimated that each diaphragm plate and insulation plate sandwich can generally accommodate a temperature difference of 120° F. between itself and its neighbor without reaching yield stress levels. In this manner, the temperature gradient is held to a magnitude acceptable to the more flexible but less strong components of the second support assembly 72. Thus, overall, the temperature is gradually stepped up or down between the forward header 28 and the assembly 24, permitting all the disks in the manifold assembly to operate under stresses well below their yield limits. Indeed, it is estimated that the combination of the diaphragm plates of the first support assembly 62 and the components of the second support assembly 72, to be described, can withstand a total temperature difference of 500° F., without failure.

Figure 6:
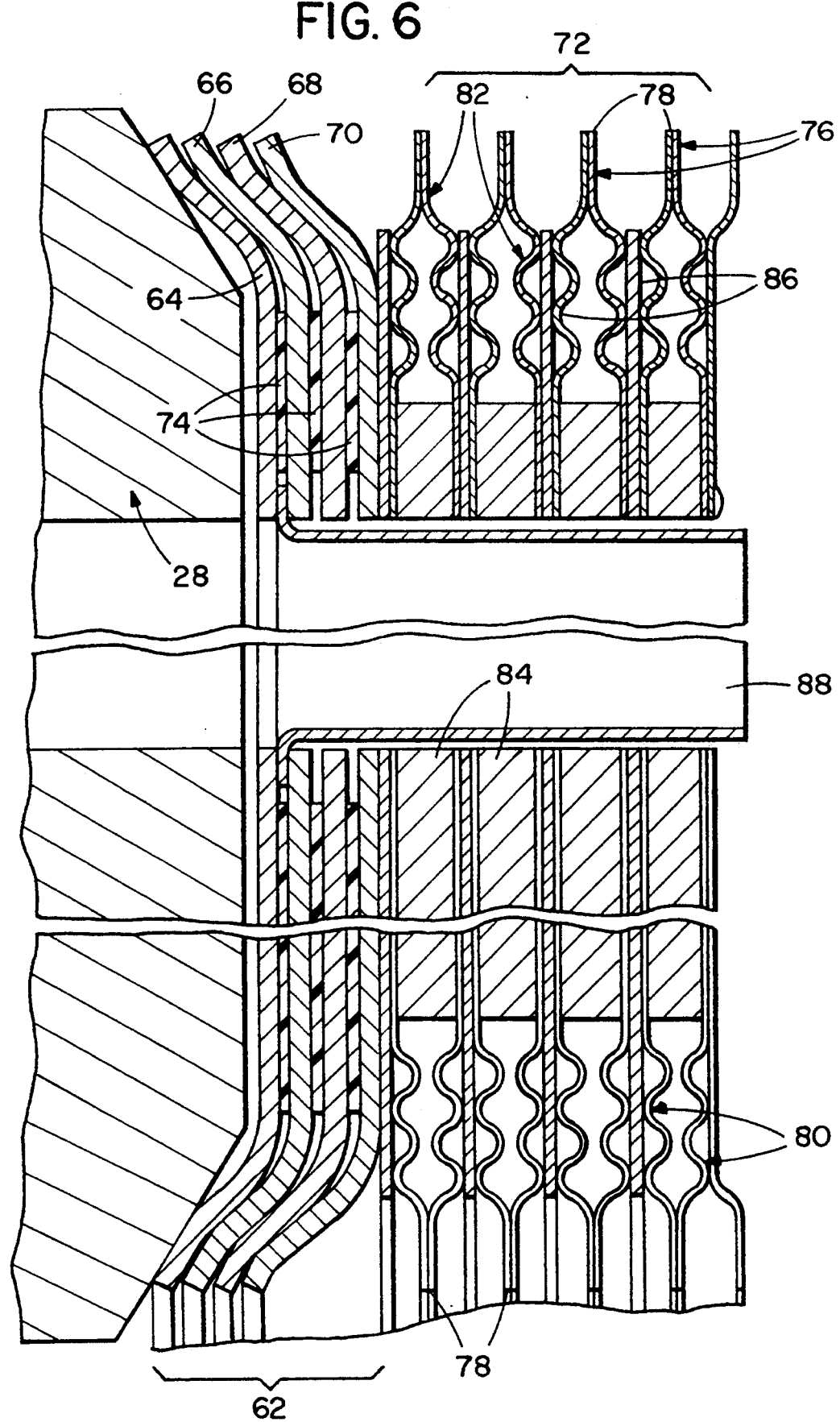
FIG. 6 is a detail cross-section view illustrating the interface, according to the invention, between the recuperator and the forward header.

With continuing reference to FIG. 6, the second support assembly 72 utilizes four pairs of radial bellows plates 76 which have a much higher degree of radial flexibility than the present production "accordion" plates 58 (FIG. 4) which they are intended to replace. Each plate pair 76 is suitably welded together at a common radial location indicated at 78 and is formed with in-board circumferential bellows 80 and outboard circumferential bellows 82. Intermediate each plate pair 76 is a metal spacer 84 which serves to prevent the plate pairs from crushing due to the preload and the pressure of the air. Metal spacers 84 also serve to provide a high thermal capacitance so that the heat transfer is gradual and a low temperature gradient is maintained during transient engine operation. Flat 15 mil plates 86 are positioned between the plate pairs 76 to prevent nesting and interlocking of the plate pairs during operation.

The transition construction just described with respect to FIG. 6 has been found to accommodate the severe stresses which were previously imparted to the recuperator 22 during and following operation of a gas turbine engine 20. The first support assembly 62 is effective in reducing the temperature gradients between the forward header 28 and the assembly 24 to an acceptable level and the circumferential bellows 80, 82 of the second support assembly 72 provide the necessary radial flexibility between the assembly 24 and the forward header 28 such that stresses remain within acceptable limits.

All of the components of the first support assembly 62 and of the second support assembly 72 are suitably apertured at a common radial location to receive an anti-rotation sleeve 88 which serves to assure that all of the non-welded components just described will remain substantially fixed throughout operation of the gas turbine engine.

Figure 7:
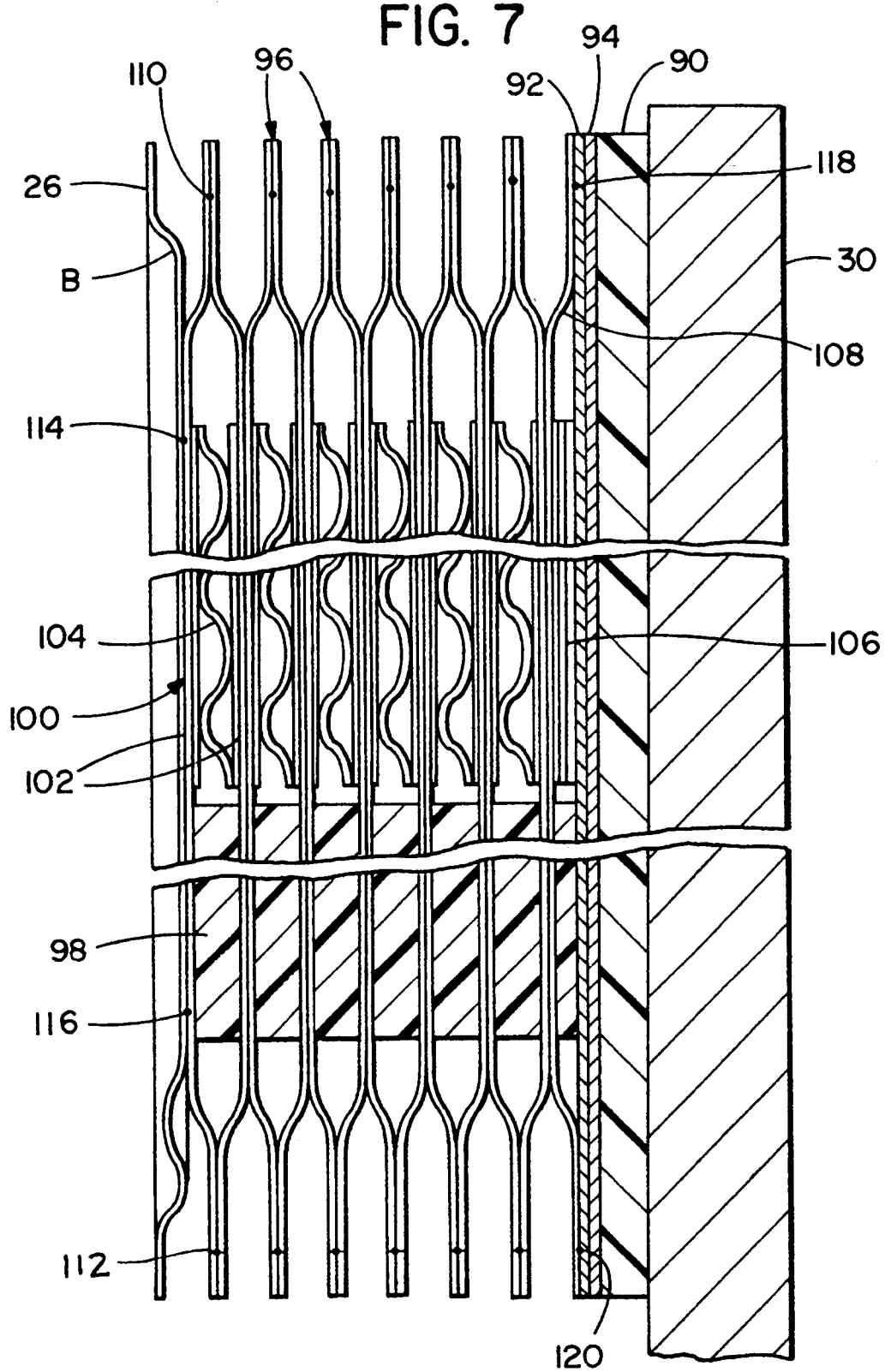
FIG. 7 is a detail cross-section view illustrating the interface, according to the invention, between the recuperator and the rear header.

Turn now to FIG. 7 for a description of the transition construction between the assembly 24 and the rear header 30. An insulator plate 90 which may be, for example, a 125 mil fixed sheet of mica, is positioned intermediate the rear header 30 and a pair of graphite-coated plane plates 92, 94. The graphite coating between the plane plates 92, 94 assures their ability to slide across one another while fully engaged. Between the plane plates 92, 94 and a last disk 26, a B-plate, of the assembly 24, are a plurality of "accordion" plate pairs 96 generally of the production design described above.

In order to prevent crushing due to preload and to reduce the transient temperature differences occurring between the inner diameter and the outer diameter of the rearwardmost disks 26 of the assembly 24, as well as axially between adjacent plate pairs, a set of annular insulation plates 98 and annular spring plates 100 are used as sandwich material within each accordion plate pair 96. The insulation plates 98 may be, for example, 60 mil mica. Each spring plate 100 may be, for example, a pair of spaced apart flat plates 102 with an intermediate corrugated sheet 104 providing the desired spacing with a minimum of weight. Plane spacer plates 106 may be employed between a last accordion plate 108 and the plane plate 92 to prevent crushing thereof.

In order to maintain the aft assembly just described as a unit, it is desirable for each "accordion" plate pair 96 to be circumferentially welded as at 110 and 112 and for the rearwardmost annular disk 26 to be attached to the forwardmost accordion plate pair as by welds 114, 116. In similar fashion, the rearwardmost accordion plate 108 is desirably attached to the plane plate 92 as by welds 118, 120.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A recuperator system for preheating air before it enters the combustion chamber of a gas turbine engine comprising:

an assembly adjacent a power turbine for the engine extending between a forward end and a rear end and having a central passage extending between said forward end and said rear end and a plurality of cross passages communicating with said central passage for containing and guiding flow of exhaust gases from the engine through said assembly, then exhausting it from said assembly;

said assembly exhibiting a first rate of heat conduction and including:

first conduit means extending along the length of said assembly for receiving and guiding the flow of cold air to be heated;

second conduit means extending along the length of said recuperator for receiving and guiding the flow of pre-heated air toward the combustion chamber of the engine; and cross conduit means for connecting said first and second conduits at a plurality of locations along the length of said assembly, said cross conduit means being proximate to the cross passages whereby the cold air from said first conduit means becomes pre-heated by the exhaust gases as it flows toward said second conduit means; and transition means mounting said assembly on said gas turbine engine, said transition means thermally isolating said assembly from the gas turbine engine and accommodating relative movement between said assembly and the gas turbine engine resulting from temperature differentials occurring during operation of said gas turbine engine.

2. A recuperator system for preheating air as set forth in claim 1 including:

header means on the gas turbine engine;

said transition means mounting said assembly on said header means at said forward end and at said rear end;

said header means exhibiting a second rate of conduction which is less than said first rate of conduction.

3. A system for preheating air as set forth in claim 2 wherein said transition means includes:

first support means for thermally isolating said assembly from said header means; and second support means for accommodating relative movement between said assembly and said header means resulting from temperature differentials occurring during operation of said gas turbine engine;

said first support means being fixed to said header means; and said second support means being fixed to, and intermediate, said first support means and said assembly.

4. A system for preheating air as set forth in claim 3 wherein said assembly is substantially cylindrical; wherein said first support means includes:

at least one structural disk-shaped plate member having an outer peripheral edge fixed to said header means;

at least one disk-shaped insulating member coaxial with said assembly and contiguous with said structural plate member; and wherein said second support means includes:

a bearing plate member coaxial with said assembly and contiguously engaged with said first support means; and disk-shaped resilient means coaxial with said assembly and contiguously engaged with said first support means for accommodating radial movement between said first support means and said assembly.

5. A system for preheating air as set forth in claim 4 wherein said resilient means includes:

a circular plate member having an outer peripheral rim; and an annular bellows on said circular plate member adjacent said outer peripheral rim.

6. A recuperator system for preheating air as set forth in claim 1:

a plurality of annular disks in side-by-side relationship, each of said disks having a plurality of first openings at successive spaced circumferential locations, each of said disks having a plurality of second openings at successive spaced circumferential locations respectively intermediate the first openings, the first openings of said plurality of disks at each circumferential location being aligned along the length of said recuperator to thereby define said first conduit, the second openings of said plurality of disks at each circumferential location being aligned along the length of said recuperator to thereby define said second conduit, said first and second conduits being substantially parallel, said annular disks being formed such that, when contiguously positioned, each adjacent pair of said disks defines therebetween the plurality of said cross conduits and the plurality of said cross passages.

7. A system for preheating air as set forth in claim 1 including:

a forward header on the gas turbine engine for supporting said assembly at said forward end, said forward header having an entry passage for receiving ambient air and delivering it to said first conduit; and a rear header on the gas turbine engine for supporting said assembly at said rear end;

said forward header and said rear header both exhibiting a second rate of conduction which is less than said first rate of conduction.

8. A system for preheating air as set forth in claim 4 wherein said transition means includes:

first support means for thermally isolating said assembly from said forward header means; and second support means for accommodating relative movement between said assembly and said forward header means resulting from temperature differentials occurring during operation of said gas turbine engine;

said first support means being fixed to said forward header means; and said second support means being fixed to, and intermediate, said first support means and said assembly; and a plurality of isolation plates lying in parallel spaced apart planes;

a plurality of annular insulating members intermediate said isolation plates and adjacent the central passage;

a plurality of annular resilient spacer members intermediate said isolation plates distant from said central passage, each successive pair of said resilient spacer members and said annular insulating members being coplanar; and a slider plate fixed to said rear header and slidably engaged with a rearwardmost one of said isolation plates.

9. A system for preheating air as set forth in claim 8 including an insulation sheet intermediate said slider plate and said rear header.

10. A system for preheating air as set forth in claim 9 wherein said assembly is substantially cylindrical; and wherein said resilient means includes:

a circular plate member having an outer peripheral rim; and an annular bellows on said circular plate member adjacent said outer peripheral rim.

11. A system for preheating air as set forth in claim 6 including:

a cylindrical heat shield fixed to said isolation plates for preventing the exhaust gases flowing through the central passage from flowing across said isolation plates.

12. In a recuperator system for preheating air before it enters the combustion chamber of a gas turbine engine including a assembly extending between a forward end and a rear end and having a central passage extending between said forward end and said rear end and a plurality of cross passages communicating with said central passage for containing and guiding flow of exhaust gases from the engine through said assembly, then exhausting it from said assembly, said assembly having at least a first conduit extending along its length for receiving and guiding the flow of cold air to be heated, at least one second conduit extending along the length of said assembly for receiving and guiding the flow of pre-heated air toward the combustion chamber of the engine, and a plurality of cross conduits for connecting the first and second conduits at a plurality of locations along the length of said assembly, said cross conduits being proximate to said cross passages whereby the cold air from said first conduit becomes pre-heated by the exhaust gases as it flows toward the second conduit, the improvement comprising:

transition means between said header means and said assembly for thermal isolation thereof and for accommodating relative movement therebetween resulting from temperature differentials occurring during operation of the gas turbine engine.

13. A system for preheating air as set forth in claim 12 including:

a forward header on the gas turbine engine for supporting said assembly at said forward end, said forward header having an entry passage for receiving ambient air and delivering it to said first conduit; and a rear header on the gas turbine engine for supporting said assembly at said rear end;

said forward header and said rear header both exhibiting a second rate of conduction which is less than said first rate of conduction.

14. A system for preheating air as set forth in claim 12 wherein said recuperator includes:

a plurality of annular disks in side-by-side relationship, each of said disks having a plurality of first openings at successive spaced circumferential locations, each of said disks having a plurality of second openings at successive spaced circumferential locations respectively intermediate the first openings, the first openings of said plurality of disks at each circumferential location being aligned along the length of said recuperator to thereby define the first conduit, the second openings of said plurality of disks at each circumferential location being aligned along the length of said recuperator to thereby define the second conduit, said first and second conduits being substantially parallel, said annular disks being formed such that, when contiguously positioned, each adjacent pair of said disks defines therebetween said plurality of cross conduits and said plurality of cross passages.

15. A system for preheating air as set forth in claim 14 wherein said transition means includes:

first support means for thermally isolating said assembly from said forward header means; and second support means for accommodating relative movement between said assembly and said forward header means resulting from temperature differentials occurring during operation of said gas turbine engine;

said first support means being fixed to said forward header means; and said second support means being fixed to, and intermediate, said first support means and said assembly; and a plurality of isolation plates lying in parallel spaced apart planes;

a plurality of annular insulating members intermediate said isolation plates and adjacent the central passage;

a plurality of annular resilient spacer members intermediate said isolation plates distant from said central passage, each successive pair of said resilient spacer members and said annular insulating members being coplanar; and a slider plate fixed to said rear header and slidably engaged with a rearwardmost one of said isolation plates.

16. A system for preheating air as set forth in claim 15 including an insulation sheet intermediate said slider plate and said rear header.

17. A system for preheating air as set forth in claim 16 wherein said assembly is substantially cylindrical; and wherein said resilient means includes:

a circular plate member having an outer peripheral rim; and an annular bellows on said circular plate member adjacent said outer peripheral rim.

18. A system for preheating air as set forth in claim 17 including:

a cylindrical heat shield fixed to said isolation plates for preventing the exhaust gases flowing through the central passage from flowing across said isolation plates.

\* \* \* \* \*